United States Patent
Marupaduga et al.

(10) Patent No.: US 10,021,691 B1
(45) Date of Patent: Jul. 10, 2018

(54) FREQUENCY ALLOCATION BASED ON GROUP DELAY VARIATION

(71) Applicant: Sprint Spectrum L.P., Overland Park, KS (US)

(72) Inventors: Sreekar Marupaduga, Overland Park, KS (US); John W. Prock, Raymore, MO (US); Andrew M. Wurtenberger, Olathe, KS (US); Gauravpuri Goswami, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 625 days.

(21) Appl. No.: 14/475,709

(22) Filed: Sep. 3, 2014

(51) Int. Cl.
  *H04W 72/00* (2009.01)
  *H04W 72/04* (2009.01)
  *H04B 7/14* (2006.01)

(52) U.S. Cl.
  CPC .......... *H04W 72/0453* (2013.01); *H04B 7/14* (2013.01)

(58) Field of Classification Search
  None
  See application file for complete search history.

(56) References Cited

U.S. PATENT DOCUMENTS

| | | | |
|---|---|---|---|
| 6,496,490 B1* | 12/2002 | Andrews | H04W 16/10 370/329 |
| 7,665,090 B1* | 2/2010 | Tormasov | G06F 9/4881 718/104 |
| 2011/0158156 A1* | 6/2011 | Ma | H04B 7/15542 370/315 |
| 2012/0147811 A1* | 6/2012 | Ohyama | H04L 5/0042 370/315 |
| 2013/0242776 A1* | 9/2013 | Kazmi | H04W 16/04 370/252 |
| 2016/0037322 A1* | 2/2016 | Nguyen | H04W 76/14 370/329 |

* cited by examiner

*Primary Examiner* — Jinsong Hu
*Assistant Examiner* — Alexander Yi

(57) ABSTRACT

Systems and methods for allocating frequencies based on group delay variation considerations include a base station that operates in a frequency range comprising a first set of frequency groups and a second set of frequency groups, where frequency groups of the first set are less susceptible to group delay variation based impairments than the frequency groups of the second set. In response to a requirement to transmit data between the base station and a particular UE, the base station determines whether the particular UE is receiving wireless service directly from the base station or via a relay associated with the base station, and when the particular UE is receiving wireless service via the relay, the base station allocates one or more frequency groups from the first set of frequency groups to use for transmitting data between the base station and the particular UE to satisfy the requirement.

17 Claims, 4 Drawing Sheets

FREQUENCY ALLOCATION BASED ON GROUP DELAY VARIATION

BACKGROUND

Unless otherwise indicated herein, the materials described in this section are not prior art to the claims and are not admitted to be prior art by inclusion in this section.

Cellular wireless networks typically include a number of base stations that radiate to define wireless coverage areas, such as cells and/or cell sectors, in which user equipment devices (UEs) (also known as wireless communication devices (WCDs)) such as cell phones, "smart" phones, tablet computers, tracking devices, embedded wireless modules, and other wirelessly equipped communication devices, can operate. Each base station is coupled to network infrastructure that provides connectivity with one or more transport networks, such as the public switched telephone network (PSTN) for voice communications and/or the Internet for voice and/or data communications.

In general, a wireless network operates in accordance with a particular air interface protocol or radio access technology, with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1xRTT and 1xEV-DO), and Global System for Mobile Communications (GSM), among others. Each protocol defines its own procedures for registration of UEs, initiation of communications, allocation of bandwidth for UE communications, handoff/handover between coverage areas, and functions related to air interface communication.

Some cellular wireless network deployments also include wireless network relays to extend the coverage area of certain base stations. Some relays amplify both uplink signals from UEs to a base station and downlink signals from a base station to UEs. Other relays additionally receive, demodulate, re-modulate, and re-transmit uplink and downlink signals between a base station and UEs. In either configuration, each relay is coupled to and associated with a base station that manages the allocation of wireless network frequencies in the base station's coverage area.

With this arrangement, a UE within the coverage area of the wireless network may engage in air interface communication directly with a base station or indirectly with the base station via a relay connected to the base station, depending on whether the UE is within wireless range of the base station or the relay. This arrangement enables UEs to communicate via the base station, or via a relay to the base station, with various remote network entities or with other UEs served by the base station.

OVERVIEW

Wireless network base stations and wireless network relays typically operate within a configured frequency range. In operation, a base station and its associated relay typically include amplifiers to amplify RF signals, band-pass filters to pass the configured frequency range (i.e., the pass band of the filter), and band-stop filters to block frequencies outside of the configured frequency range. For example, in some LTE deployments, a base station and an associated relay may be configured with filters that pass an entire LTE band (e.g., LTE Band 41) and block frequencies outside of the band. In other LTE deployments, a base station and an associated relay may be configured with filters that pass a portion of an LTE band (e.g., a 50 MHz range of frequencies within LTE Band 41 and block frequencies outside of the desired portion the LTE band (e.g., outside of the desired 50 MHz frequency range).

Signals that traverse the amplifiers and filters of base stations and relays will experience various signal impairments, including group delay, which is a measure of the time delay of the amplitude envelopes of the various sinusoidal components (e.g., subcarriers in multi-carrier transmission systems) of the signal as the signal propagates through a filter and/or amplifier. Group delay is inversely proportional to filter bandwidth and nearly proportional to the order of the filter. In multi-carrier transmission systems, all of the subcarriers of a signal are delayed when the signal propagates through a filter and/or amplifier. However, the delay tends to be frequency-dependent, and thus, the delay will be different for the various subcarriers. For example, subcarriers near the edge of the filter's pass band tend to experience greater group delay than subcarriers in the middle of the filter's pass band.

In LTE networks, group delay variation tends to be more problematic than the delay of any individual subcarrier in part because of the way subcarriers are managed and allocated for data transmissions between base stations and UEs. In particular, in LTE networks, an LTE band is divided into many small resource blocks, where each resource block includes twelve 15 kHz subcarriers. In the downlink direction (from the base station to the UE), LTE uses Orthogonal Frequency Division Multiple Access (OFDMA) to allocate resource blocks to data transmissions, where the subcarriers of an active resource block are modulated using, for example, QPSK (Quadrature Phase-Shift Keying), 16-QAM (Quadrature Amplitude Modulation), 64-QAM, or perhaps other digital modulation schemes. In the uplink direction (from the UE to the base station), LTE uses a pre-coded version of OFDM known as Single Carrier Frequency Division Multiple Access (SC-FDMA), where data is spread across the subcarriers of one or more resource blocks, which are modulated using, for example, QPSK, 16-QAM, 64-QAM, or perhaps other digital modulation schemes. Differences in the group delay between the subcarriers of a resource block, as well as differences in the group delay between subcarriers of different resource blocks, can cause signal distortions that reduce signal quality. Group delay variation based distortion may render some subcarriers unable support higher order modulation schemes (e.g., 16-QAM and 64-QAM). As a result, in some instances, the affected subcarriers may only be able to support lower order modulation schemes (e.g., QPSK), thereby reducing the effective throughput that can be achieved with the affected subcarriers.

One way to eliminate or at least reduce the adverse effects of group delay variation is to intelligently manage the allocation of subcarriers and groups of subcarriers (e.g., LTE resource blocks) for data transmissions between base stations and UEs that traverse a relay. As described previously, base stations typically include filters configured to pass a desired range of frequencies and block frequencies outside of the desired frequency range. Relays also typically include filters for passing the desired frequency range and blocking frequencies outside of the desired range. The filters at the base station cause group delay, and the filters at the relay also cause group delay. Because of the group delay caused by the filters, a signal that traverses filters at both a base station and a relay will experience more group delay (and correspondingly more group delay variation) than a signal that traverses only filters at the base station. Additionally, group delay is frequency-dependent, and subcarriers near the edges of each filter's pass band will experience greater group delay (and correspondingly greater group delay variation) than subcarriers near the middle of each filter's pass band. Accordingly, a base station can reduce the adverse effects of group delay variation by allocating subcarriers that experience less group delay variation (e.g., subcarriers at frequencies away from the edges of a filter pass band) to transmissions that must traverse both a relay and a base station, and allocating subcarriers that experience greater group delay variation (e.g., subcarriers at frequencies near the edges of a filter pass band) to transmissions that traverse only a base station.

In a wireless network comprising a base station and a relay configured to operate within a frequency range, when the base station determines that it needs to allocate subcarriers in the wireless network for transmitting data between the base station and a particular UE also operating within the configured frequency range, the base station determines whether that particular UE is receiving wireless service (i) directly from the base station or (ii) indirectly from the base station via the relay. And if the UE is receiving wireless service via the relay, then the base station allocates subcarriers that are away from the edges of the configured frequency range. Because subcarriers away from the edges of the configured frequency range are less susceptible to group delay based impairments caused by the filters at the base station and the relay, data transmissions that utilize those subcarriers will experience less group delay variation based distortion (and other group delay variation impairments) than data transmissions using subcarriers closer to the edges of the configured frequency range. Thus, in such instances, intelligent subcarrier allocation can remediate or at least ameliorate the deleterious effects of group delay variation.

Disclosed herein are systems and methods for frequency allocation based at least in part on group delay variation considerations. Some embodiments include a base station determining that a requirement exists to transmit some amount of data over a wireless network on the uplink and/or downlink between a base station and a particular UE, such as data for a voice or video call, a text message, streaming media, data transmission (e.g., email or web browsing), or data for any other type of communications or Internet-based application now know or later developed. In operation, the base station and the UE are configured to operate in a frequency range that includes a first set of frequency groups and a second set of frequency groups, where frequency groups of the first set are less susceptible to group delay variation based impairments than the frequency groups of the second set. In some embodiments, the frequency groups of the first set may be considered low group delay frequency groups, and the frequency groups of the second set may be considered high group delay frequency groups.

In response to determining the existence of the requirement to transmit the data between the base station and the particular UE, the base station determines whether the particular UE is receiving wireless service directly from the base station or indirectly from the base station via a relay configured to extend the coverage area of the base station. Then, in response to determining that the UE is receiving wireless service via the relay, the base station allocates one or more frequency groups from the first set of frequency groups to use for transmitting the data corresponding to the requirement on the uplink and/or downlink.

Some embodiments further include, in response to determining that the particular UE is receiving wireless service directly from the base station (rather than indirectly via the relay), allocating one or more frequency groups from the second set of frequency groups to use for transmitting the data on the uplink and/or downlink to satisfy the requirement.

Some embodiments alternatively include, in response to determining that the particular UE is receiving wireless service directly from the base station, determining how many frequency groups in each of the first and second sets are currently allocated for data transmissions for other UEs, and (i) in response to determining that the number of currently allocated frequency groups of the first set exceeds the number of currently allocated frequency groups of the second set, allocating one or more frequency groups from the second set to use for transmitting the data corresponding to the requirement, and (ii) in response to determining that the number of currently allocated frequency groups of the second set exceeds the number of currently allocated frequency groups of the first set, allocating one or more frequency groups from the first set to use for transmitting the data corresponding to the requirement.

This overview is illustrative only and is not intended to be limiting. In addition to the illustrative aspects, embodiments, and features described herein, further aspects, embodiments, and features will become apparent by reference to the figures and the following detailed description. The features and advantages of the disclosed systems and methods, as well as other aspects, advantages, and alternatives will become apparent to those of ordinary skill in the art by reading the following detailed description, with reference where appropriate to the accompanying drawings.

DETAILED DESCRIPTION

The systems and methods described herein are set forth only as examples. As such, those skilled in the art will appreciate that other arrangements and element (e.g., machines, interfaces, functions, orders, and groupings of functions) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For example, one or more processors executing instructions stored in memory may implement one or more of the features and functions described herein.

Figure 1:
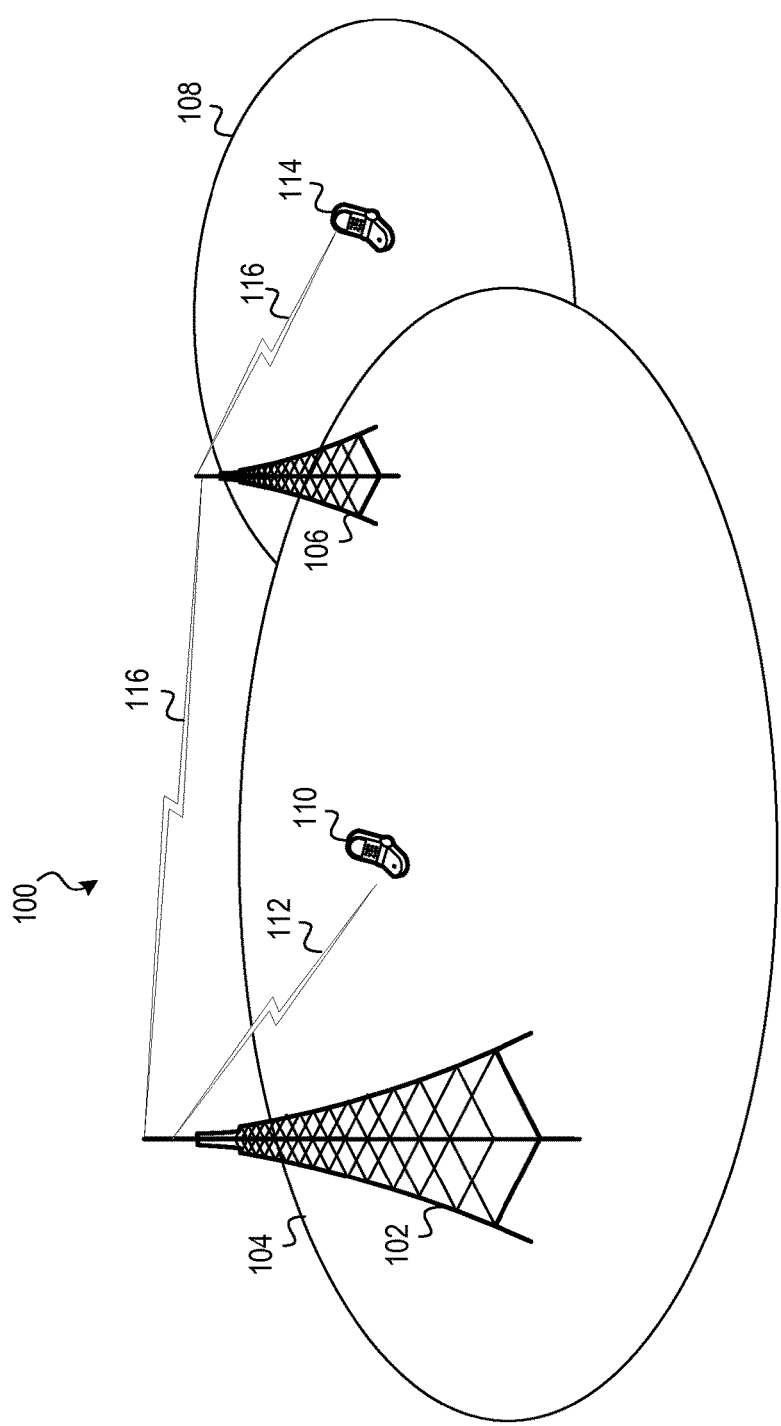
FIG. 1 is a simplified network diagram of an example wireless communications network according to some embodiments of the disclosed systems and methods.

FIG. 1 is a simplified network diagram of a wireless network 100 configured for frequency allocation based on group delay variation according to embodiments of the systems and methods described herein.

Wireless network 100 includes base station 102 and relay 106. Base station 102 may include one or more base transceiver stations (BTSs), access nodes, node-Bs, eNodeBs (eNBs), and/or other supporting network infrastructure. In the example shown in FIG. 1, the wireless network is an LTE network and base station 102 is an LTE eNodeB. However, in other embodiments, the wireless network may operate according to other wireless protocols, including but not limited to any of the wireless protocols disclosed herein.

Base station 102 is configured to provide wireless service to UEs within a wireless coverage area defined by regions 104 and 108. In operation, base station 100 provides wireless service directly to UEs located in region 104. For example, base station 102 provides wireless service directly to UE 110 via wireless link 112 between base station 102 and UE 110. Base station 102 also provides wireless service indirectly to UEs located in region 108 via relay 106. For example, base station 102 provides wireless service indirectly to UE 114 via wireless link 116, which is amplified by relay 106 to reach UEs in region 108, such as UE 114. In operation, relay 106 amplifies both downlink transmissions from base station 102 to UE 114 and uplink transmissions from UE 114 to base station 102. In some embodiments, relay 106 may additionally receive, demodulate, re-modulate, and retransmit uplink and downlink transmissions between base station 102 and UE 114. In either case, relay 106 extends the wireless coverage area of base station 102 to include region 108. Without relay 106, the wireless coverage area of base station 102 might only include region 104 because wireless transmissions from base station 102 may not otherwise reach UEs located in region 108, and wireless transmissions from UEs in region 108 may not otherwise reach base station 102.

Base station 102 and relay 106 operate within a configured frequency range. More particularly, base station 102 and relay 106 include amplifiers to amplify RF signals, band-pass filters to pass the configured frequency range (i.e., the pass band of the filter), and band-stop filters to block frequencies outside of the configured range. For example, in some embodiments, base station 102 and relay 106 may be configured with filters that pass an entire LTE band (e.g., LTE Band 41) and block frequencies outside of the band. In other embodiments, base station 102 and relay 106 may be configured with filters that pass a portion of an LTE band (e.g., a 50 MHz range of frequencies within LTE Band 41), and block frequencies outside of the desired portion the LTE band (e.g. outside of the desired 50 MHz frequency range).

In operation, base station 102 allocates one or more LTE resource blocks for data transmissions on the downlink from the base station to a UE and on the uplink from a UE to the base station. As described previously, each LTE resource block includes twelve 15 kHz subcarriers. Embodiments based on wireless protocols other than LTE may allocate different sets or groups of frequencies other than groups of twelve 15 kHz subcarriers.

Typically, base station 102 allocates resource blocks for data transmissions in response to determining a need to transmit data between the base station 102 and a particular UE. The determination may be based on a request received from a UE and/or instructions or data forwarded from a serving gateway and/or application server (e.g., multimedia application servers, Internet application servers, or similar). For example, the base station 102 may determine the existence of a requirement to transmit data to/from a particular UE upon receiving a request to transmit data from that particular UE. In another example, the base station 102 may determine the existence of a requirement to transmit data to a particular UE upon receiving data addressed to the particular UE from a serving gateway. In yet another example, the base station 102 may determine the existence of a requirement to transmit data to/from a particular UE upon receiving call set up messages from an application server (e.g., a multimedia call server), or perhaps a policy server associated with an application server, with instructions to allocate bandwidth for transmitting multimedia data to/from the particular UE. In operation, the data may be a voice or video call, a text message, streaming media, a data transmission (e.g., email or web browsing), or data for any other type of communications or Internet-based application now know or later developed. In some embodiments, the allocation of resource blocks (or other groupings of subcarriers) is a function implemented by one or more processors running software at the base station.

In response to determining the existence of the requirement to transmit data between the base station 102 and a particular UE, base station 102 determines whether the particular UE is served directly by the base station 102 or indirectly by the base station 102 via relay 106. For example, if the requirement is related to a phone call for UE 110, then the particular UE (i.e., UE 110) is served directly by the base station 102. But if the requirement is related to a phone call for UE 114, then the particular UE (i.e., UE 114) is served indirectly by the base station 102 via relay 106. In such an instance, the UE 114 may be considered to be served via relay 106.

If the UE is served via relay 106, then to satisfy the requirement, the base station will allocate one or more resource blocks with subcarriers that will experience low (e.g., less than a threshold) group delay variation when the subcarriers propagate through the filters and amplifiers of the relay 106 and the base station 102. By allocating groups of subcarriers that will experience lower group delay variation to use for data transmissions that must traverse the filters and amplifiers of both the base station 102 and the relay 106, the frequency allocation scheme implemented by the base station 102 helps to avoid the combined adverse effects of the frequency-based group delay variation introduced by the filters and amplifiers of both the base station 102 and relay 106.

But if the particular UE is served directly by the base station 102 (rather than via the relay 106), then the subcarriers of the resource blocks allocated to satisfy the requirement will traverse only the base station's filters and amplifiers. In particular, subcarriers of resource blocks allocated to data transmissions for UE 110 will traverse only the filters and amplifiers of the base station 102. By contrast, subcarriers of resource blocks allocated to data transmissions for UE 114 will traverse the filters and amplifiers of both the relay 106 and the base station 103. Because subcarriers for data transmissions between the base station 102 and UE 110 will traverse fewer filter and amplifier components that cause group delay variation, the base station 102 can allocate subcarriers that are more susceptible to group delay variation for transmissions to/from UE 110. Indeed, groups of subcarriers that may be undesirable or even unsatisfactory for data transmissions for UEs in region 108 (served via relay 106) may still be acceptable for data transmissions for UEs in region 104 (served directly by the base station 102) because the subcarriers allocated for data transmissions to/from UEs in region 104 will traverse fewer group delay variation inducing components than subcarriers allocated for data transmissions to/from UEs in region 108.

In some embodiments, the subcarriers in the configured frequency range of the base station 102 and relay 106 (based on the pass band of the filters at the base station and relay) can be organized into a first set of resource blocks and a second set of resource blocks, where subcarriers of the first set of resource blocks are comparatively less susceptible to group delay variation than subcarriers of the second set of resource blocks, and correspondingly, subcarriers of the second set of resource blocks are comparatively more susceptible to group delay variation than subcarriers of resource blocks in the first set. In operation, the number of resource blocks in each of the first and second sets may depend on the total bandwidth and the organization of the configured frequency range.

For example, in embodiments where the configured frequency range corresponds to the entirety of an LTE Band for uplink and downlink transmissions (e.g., LTE Band 41, which is Time Division Duplex (TDD)), resource blocks with subcarriers close to the edges (e.g., within ~10-20 MHz of the edges, corresponding to ~100-200 LTE resource blocks) of the configured frequency range (i.e., 2496-2690 MHz, or 194 MHz) will experience greater group delay variation than subcarriers of resource blocks closer to the middle of the configured frequency range. In such embodiments, the second set of resource blocks may include all of the resource blocks in LTE Band 41 with subcarriers that are within a threshold distance (e.g., ~10-20 MHz) from the edges of the configured frequency range (i.e., the entirety of Band 41), and the first set of resource blocks may include the remaining resource blocks in LTE Band 41 with subcarriers that are outside of the threshold distance from the edges of the configured frequency range.

In one example where there configured range is the entirety of LTE Band 41 (i.e., 2496-2690 MHz, or 194 MHz) and the threshold from the edge of the configured range is 20 MHz, the first set of resource blocks includes about 855 resource blocks with subcarriers between about 2516-2670 MHz (about 154 MHz), and the second set of resource blocks includes about 220 resource blocks with subcarriers between about 2496-2516 MHz (within about 20 MHz of the left edge of the configured frequency range) and about 2670-2690 MHz (within about 20 MHz of the right edge of the configured frequency range).

In some embodiments, the configured frequency range may correspond to some subset or portion of an LTE band. For example, if the configured frequency range corresponds to a 50 MHz range within LTE Band 41 for uplink and downlink transmissions (e.g., from 2450 MHz to 2500 MHz), then subcarriers close to the edges (e.g., within ~5-8 MHz of the edges, corresponding to ~60-80 LTE resource blocks) of the configured frequency range (i.e., 2450-2500 MHz) will experience greater group delay variation than subcarriers closer to the middle of the configured frequency range. In such embodiments, the second set of resource blocks may include all of the resource blocks in the 50 MHz frequency range that are within 5-8 MHz from the edges of the configured frequency range, and the first set of resource blocks may include all of the remaining resource blocks in the 50 MHz frequency range that are not in the second set.

In one example where the configured frequency range is a 50 MHz subset (e.g., from 2450-2500 MHz) of LTE Band 41 and the threshold from the edge of the configured range is 5 MHz, the first set of resource blocks includes about 222 resource blocks with subcarriers between about 2455-2495 MHz (about 40 MHz), and the second set of resource blocks includes about 55 resource blocks with subcarriers between about 2450-2455 MHz (within about 5 MHz of the left edge of the configured frequency range) and about 2495-2500 MHz (within about 5 MHz of the right edge of the configured frequency range).

In another example, a base station and relay may use a first frequency range for uplink transmissions and a second frequency range for downlink transmissions (e.g., in LTE Bands 25 and 26, which are Frequency Division Duplex (FDD)), where each of the first and second frequency ranges has its own first and second frequency groups. In particular, the first frequency range (for downlink) may have first and second frequency groups, where subcarriers of the first frequency group are comparatively less susceptible to group delay variation than subcarriers of the second frequency group, and correspondingly, subcarriers of the second frequency group are comparatively more susceptible to group delay variation than subcarriers of the first frequency group. Likewise, the second frequency range (for the uplink) may also may have first and second frequency groups, where subcarriers of the first frequency group are comparatively less susceptible to group delay variation than subcarriers of the second frequency group, and correspondingly, subcarriers of the second frequency group are comparatively more susceptible to group delay variation than subcarriers of the first frequency group. Other configured frequency ranges and threshold distances from the edges of the configured frequency range (including embodiments where the threshold distance from the right edge of the configured frequency range is different than the threshold distance from the left edge of the configured frequency range) could be used as well, depending on the network configuration and the group delay properties of the filters deployed at the base station and relay.

When the base station 102 needs to allocate resources for transmitting data to/from the base station and a particular UE, the base station 102 determines whether the particular UE is served directly from the base station 102 or indirectly from the base station 102 via relay 106. In response to determining that the particular UE is served via the relay 106 (i.e., the UE is in region 108), the base station 102 allocates one or more resource blocks from the first set of resource blocks to use for transmitting the data between the base station 102 and the particular UE.

In some embodiments, in response to determining that the particular UE corresponding to the requirement is served directly by the base station 102 (i.e., the UE is in region 104), the base station 102 allocates one or more resource blocks from the second set of resource blocks (i.e., resource blocks having subcarriers that will experience greater group delay variation) to use for transmitting data to satisfy the requirement.

Additionally or alternatively, in some embodiments, in response to determining that the UE corresponding to the requirement is served directly by the base station 102 (rather than indirectly via the relay 106), the base station 102 determines how many resource blocks in each of the first and second sets of resource blocks are currently allocated for data transmissions associated with other UEs. Then, in response to determining that the number of currently allocated resource blocks of the first set exceeds the number of currently allocated resource blocks of the second set, the base station 102 allocates one or more resource blocks from the second set to use for transmitting the data corresponding to the requirement. But in response to determining that the number of currently allocated resource blocks of the second set exceeds the number of currently allocated resource blocks of the first set, the base station 102 allocates one or more resource blocks from the first set to use for transmitting the data corresponding to the requirement.

For example, if the base station determines that 20 resource blocks from the first set and 30 resource blocks from the second set are currently allocated to other data transmissions, then the base station may allocate resource blocks from the first set for transmitting the data between the base station and the particular UE because the number of currently allocated resource blocks of the second set exceeds the number of currently allocated resource blocks of the first set. On the other hand, if the base station determines that 40 resource blocks from the first set and 30 resource blocks from the second are currently allocated to other data transmissions, then the base station may allocate resource blocks from the second set for transmitting the data between the base station and the particular UE because the number of currently allocated resource blocks of the first set exceeds the number of currently allocated resource blocks of the second set.

In some embodiments, the base station 102 may determine whether the particular UE is served directly by the base station 102 or indirectly by the base station 102 via relay 106 by analyzing GPS coordinates of the UE to determine whether the UE is presently located in region 104 (and therefore able to send and receive radio transmissions to/from base station 102) or region 108 (and therefore sends and receives radio transmissions to/from base station 102 via relay 106). In operation, a base station may have mapping data that defines regions served directly by the base station and regions served indirectly by the base station via a relay, and the UEs served by the base station (directly or indirectly) may be configured to periodically send updated GPS coordinates to the base station. For example, base station 102 may have map data that defines regions 104 and 108, and UEs 110 and 114 may periodically send their GPS coordinates to base station 102.

Figure 2:
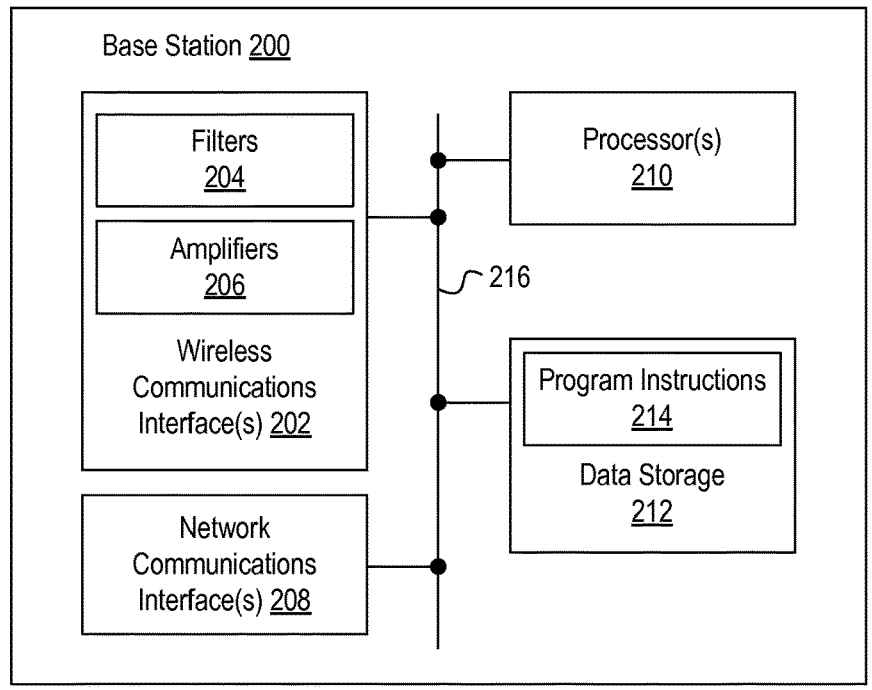
FIG. 2 is a simplified block diagram of an example base station according to some embodiments of the disclosed systems and methods.

FIG. 2 is a simplified block diagram of an example base station 200 according to some embodiments of the disclosed systems and methods, including, for example, base station 102 of FIG. 1. It will be appreciated that there can be numerous specific implementations of a base station, such as base station 200, in which the disclosed frequency allocation methods could be implemented. As such, base station 200 is representative of a means for carrying out frequency allocation, in accordance with the methods and steps described herein by way of example.

The example base station 200 includes one or more wireless communications interfaces 202, one or more network communications interfaces 208, one or more processors 210, and data storage 212, all of which may be coupled together by a system bus 216 or similar mechanism. In addition, the base station 200 may also include external storage, such as magnetic or optical disk storage (not shown). Variations from this arrangement are possible as well, including addition and/or omission of components, combination of components, and distribution of components in any of a variety of ways.

The base station components may be arranged to support wireless communications in a wireless communication network that is compliant with one or more of the variety of wireless air-interface protocols noted above, in addition to other protocols now known or later developed. In particular, the components of the example base station 200 are configured to support frequency allocation based on group delay variation in accordance with the example embodiments described herein.

The one or more wireless communications interfaces 202 may include one or more transceivers, amplifiers 206, filters 204, antennas, and other associated components that enable the base station 200 to engage in air interface communication with one or more wireless communications devices, such as UE 110 shown in FIG. 1, according to any of the air interface protocols described herein (e.g., CDMA, GSM, LTE, etc.). The one or more amplifiers 206 and filters 204 are configured to support transmissions within a configured frequency range on (1) the downlink (or forward link) from the base station 200 to a wireless communications device and (2) the uplink (or reverse link) from the wireless communications device to the base station 200. Some embodiments may use different frequency ranges for the uplink and downlink. Additionally, in some embodiments, the one or more wireless communications interfaces 202 are configured to support transmissions to and from one or more wireless communications interfaces of one or more relays associated with the base station 200.

The one or more network interfaces 208 include physical network interfaces (e.g., optical, electrical) that enable the base station 200 to send and receive traffic directly or indirectly to/from other networks, such as the Public Switched Telephone Network (PSTN), the Internet, or other networks. The one or more network interfaces 208 may take the form of Ethernet network interface cards/ports, optical network interface cards/ports or other physical interfaces to one or more transmission networks that directly or indirectly connect the base station 102 to its neighboring base stations as well as to the PSTN, the Internet, and/or other networks. Additionally, in some embodiments, the one or more network interfaces 208 are configured to support transmissions to and from one or more network interfaces of one or more relays associated with the base station 200.

The one or more processors 210 comprise one or more general-purpose processors (e.g., microprocessors) and/or one or more special-purpose processors (e.g., dedicated digital signal processors (DSPs), application specific integrated circuits (ASICs), etc.). The non-transitory data storage 212 comprises one or more volatile and/or non-volatile storage components, such as magnetic or optical memory or disk storage. Non-transitory data storage 212 can be integrated in whole or in part with the one or more processors 210, as cache memory or registers for instance. As further shown, non-transitory data storage 212 is equipped to hold program instructions 214. In some embodiments, one or more of the processors 210 and non-transitory data storage 212 may be integrated in whole or in part with one or more of the wireless communications interfaces 202 and/or network communications interfaces 208.

The program instructions 214 comprise machine language instructions that define routines and software program code executable by the one or more processors 210 (alone or in combination with the wireless communications interface(s) 202 and network communications interface(s) 208) to carry out various functions described herein. In particular, the program code 214, wireless communications interfaces 202, and network communications interfaces 208 may operate cooperatively to carry out one or more aspects of the frequency allocation methods described herein.

Figure 3:
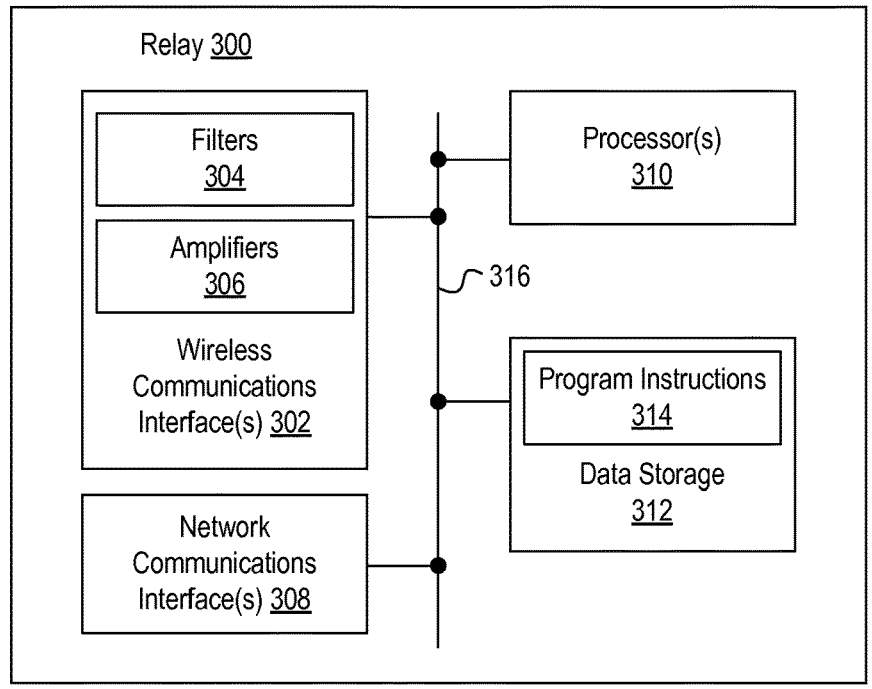
FIG. 3 is a simplified block diagram of an example relay according to some embodiments of the disclosed systems and methods.

FIG. 3 is a simplified block diagram of an example relay 300 according to some embodiments of the disclosed systems and methods, including, for example, relay 106 shown in FIG. 1. In operation, such a relay is associated with and extends the wireless coverage area of a base station. It will be appreciated that there can be numerous specific implementations of a relay, such as relay 300, in which the disclosed frequency allocation methods could be implemented. As such, relay 300 is representative of a network element that can be used in combination with a base station for carrying out frequency allocation according to the methods and steps described herein by way of example.

The example relay 300 includes one or more wireless communications interfaces 302, one or more network communications interfaces 308, one or more processors 310, and data storage 312, all of which may be coupled together by a system bus 316 or similar mechanism. In addition, the relay 300 may also include external storage, such as magnetic or optical disk storage (not shown). Variations from this arrangement are possible as well, including addition and/or omission of components, combination of components, and distribution of components in any of a variety of ways.

The relay components may be arranged to support wireless communications in a wireless communication network that is compliant with one or more of the variety of wireless air-interface protocols noted above, in addition to other protocols now known or later developed. In particular, the components of the example wireless relay 300 are configured to support frequency allocation based on group delay variation in accordance with the example embodiments described herein.

The one or more wireless communications interfaces 302 may include one or more filters 304, amplifiers 306, antennas, and associated components that enable the relay 300 to amplify radio frequency signals between a base station and UEs, such as UE 114 shown in FIG. 1. In some embodiments, the wireless communications interfaces 302 may additionally include one or more transceivers configured to receive, demodulate, re-modulate, and retransmit signals between a base station and UEs. In operation, the one or more amplifiers 306 and filters 304 support transmissions within a configured frequency range on (1) the downlink (or forward link) from an associated base station to a UE via the relay and (2) the uplink (or reverse link) from the wireless communications device to the associated base station via the relay. Some embodiments may use different frequency ranges for the uplink and downlink. Additionally, in some embodiments, the one or more wireless communications interfaces 302 are configured to support transmissions to and from one or more wireless communications interfaces of at least one base station that the relay 300 is associated with.

The one or more network interfaces 308 include physical network interfaces (e.g., optical, electrical, etc.) that enable the relay 300 to send and receive traffic directly or indirectly to/from other networks, such as the Public Switched Telephone Network (PSTN), the Internet, or other networks. The one or more network interfaces 308 may take the form of Ethernet network interface cards/ports, optical network interface cards/ports or other physical interfaces to one or more transmission networks that directly or indirectly connect the relay 300 to other network elements. Additionally, in some embodiments, the one or more network interfaces 308 are configured to support transmissions to and from one or more network interfaces of at least one base station that the relay 300 is associated with.

The one or more processors 310 comprise one or more general-purpose processors (e.g., microprocessors) and/or one or more special-purpose processors (e.g., dedicated digital signal processors (DSPs), application specific integrated circuits (ASICs), etc.). The non-transitory data storage 312 comprises one or more volatile and/or non-volatile storage components, such as magnetic or optical memory or disk storage. Non-transitory data storage 312 can be integrated in whole or in part with the one or more processors 310, as cache memory or registers for instance. As further shown, non-transitory data storage 312 is equipped to hold program instructions 314. In some embodiments, one or more of the processors 310 and non-transitory data storage 312 may be integrated in whole or in part with one or more of the wireless communications interfaces 302 and/or network communications interfaces 308.

The program instructions 314 comprise machine language instructions that define routines and software program code executable by the one or more processors 310 (alone or in combination with the wireless communications interface(s) 302 and network communications interface(s) 308) to carry out various functions described herein. In particular, the program code 314, wireless communications interfaces 302, and network communications interfaces 308 may operate cooperatively to carry out one or more aspects of the frequency allocation methods described herein.

Figure 4:
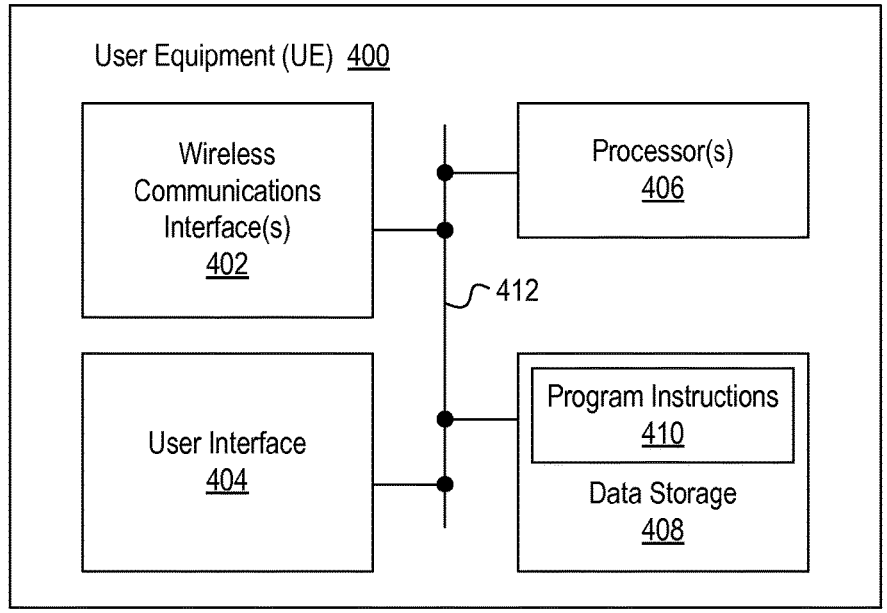
FIG. 4 is a simplified block diagram of an example UE according to some embodiments of the disclosed systems and methods.

FIG. 4 is a simplified block diagram of a UE 400 according to some embodiments of the disclosed systems and methods, including, for example, UEs 110 and 114 shown in FIG. 1. The UE 400 is configured to operate in a communication system, such as the wireless communication system 100 of FIG. 1 for example, and may execute one or more functions described herein.

The UE 400 includes one or more wireless communication interfaces 402, one or more processors 406, a user interface 404, and non-transitory data storage 408 configured to store program instructions 404, all of which may be communicatively linked together by a system bus 412 or other similar mechanism. Variations from this arrangement are possible as well, including addition and/or omission of components, combination of components, and distribution of components in any of a variety of ways.

Wireless communication interface(s) 402 includes components (e.g., radios, antennas, communications processors) configured to engage in air interface communication within a configured frequency range of a base station. For example, the wireless communication interface 402 may include one or more antenna structures and chipsets arranged to support wireless communication according to one or more air interface protocols, such as the ones disclosed and described herein (e.g., CDMA, GSM, LTE) and perhaps others (e.g., WiFi, Bluetooth, etc.)

The one or more processors 406 include one or more general purpose processors (e.g., microprocessors) and/or special purpose processors (e.g., application specific integrated circuits or the like). In some embodiments, the one or more processors 406 may be integrated in whole or in part with the one or more wireless communication interfaces 402.

The non-transitory data storage 408 comprises one or more volatile and/or non-volatile storage components. The storage components may include one or more magnetic, optical, and/or flash memory components for example. In some embodiments, the non-transitory data storage 408 may be integrated in whole or in part with the one or more processors 406 and/or the wireless communication interface (s) 402. Additionally or alternatively, the non-transitory data storage 408 may be provided separately as a non-transitory machine readable medium.

The non-transitory data storage 408 may hold (e.g., contain, store, or otherwise be encoded with) program instructions 410 (e.g., machine language instructions or other program logic, markup or the like) executable by the one or more processors 406 to carry out the various functions described herein. The non-transitory data storage 408 may also hold reference data for use in carrying out various functions described herein, e.g., information relating to the UE's current GPS coordinates. In operation, a UE may periodically report its GPS coordinates to the base station.

Figure 5A:
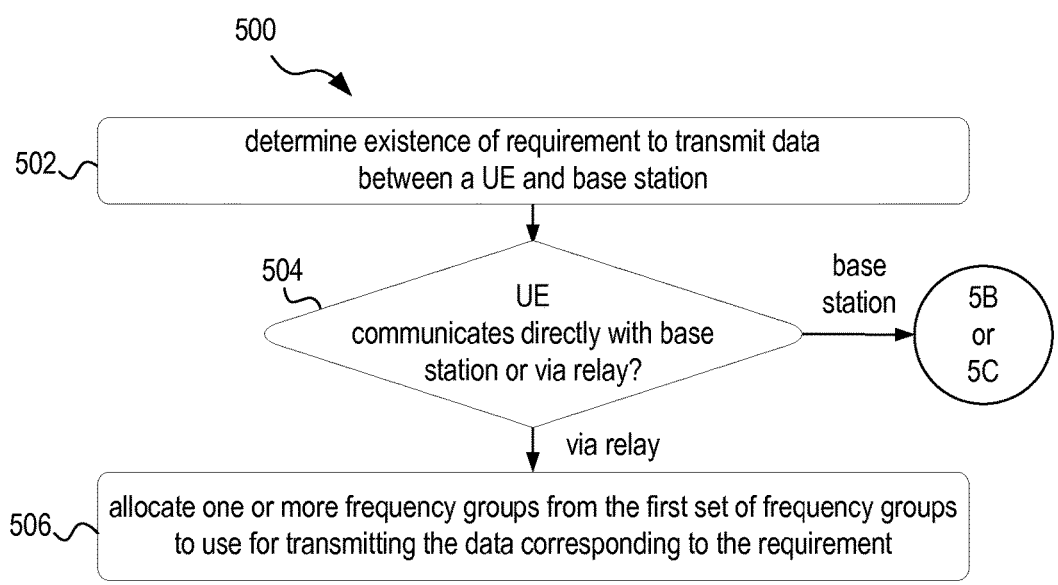
FIG. 5A is a method flow chart depicting aspects of some embodiments of the disclosed systems and methods.

FIG. 5A is a flow chart of method 500 depicting aspects of some embodiments of the disclosed systems and methods.

Method 500 starts at block 502, where a base station (or related element) determines that a requirement exists to transmit data between a particular UE and the base station. In operation, the determination may be based on a request received from the particular UE and/or instructions or data forwarded from a serving gateway and/or application server (e.g., multimedia application servers, Internet application servers, or similar), and the data may correspond to a voice or video call, a text message, streaming media, a data transmission (e.g., email or web browsing), or data for any other type of communications or Internet-based application now know or later developed.

The base station and the UE may be similar to or the same as, and may perform the same or similar functions as, any of the base stations and UEs described herein. In operation, the UE and the base station are configured to operate in a frequency range that comprises a first set of frequency groups and a second set of frequency groups, where frequency groups of the first set are less susceptible to group delay variation based impairments than the frequency groups of the second set. In some embodiments, each frequency group of the first set experiences a corresponding group delay variation that is less than a corresponding group delay variation of any frequency group of the second set.

At block 504, the base station determines whether the particular UE is either (i) directly communicating with the base station or (ii) indirectly communicating with the base station via a relay associated with the base station. The relay may be the same as or similar to any of the relays disclosed herein. In some embodiments, the determination may be based on a location of the particular UE, including but not limited to a location defined by GPS coordinates of the particular UE.

At block 504, if the base station determines that the particular UE is communicating indirectly with the base station via a relay, then the method proceeds to block 506, where the base station allocates one or more frequency groups from the first set of frequency groups to use for transmitting the data to satisfy the requirement to and/or from the base station and the particular UE via the relay associated with the base station.

Figure 5B:
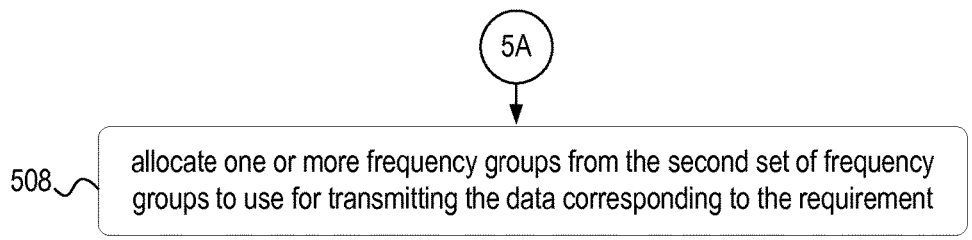
FIG. 5B is a method flow chart depicting aspects of some embodiments of the disclosed systems and methods.
Figure 5C:
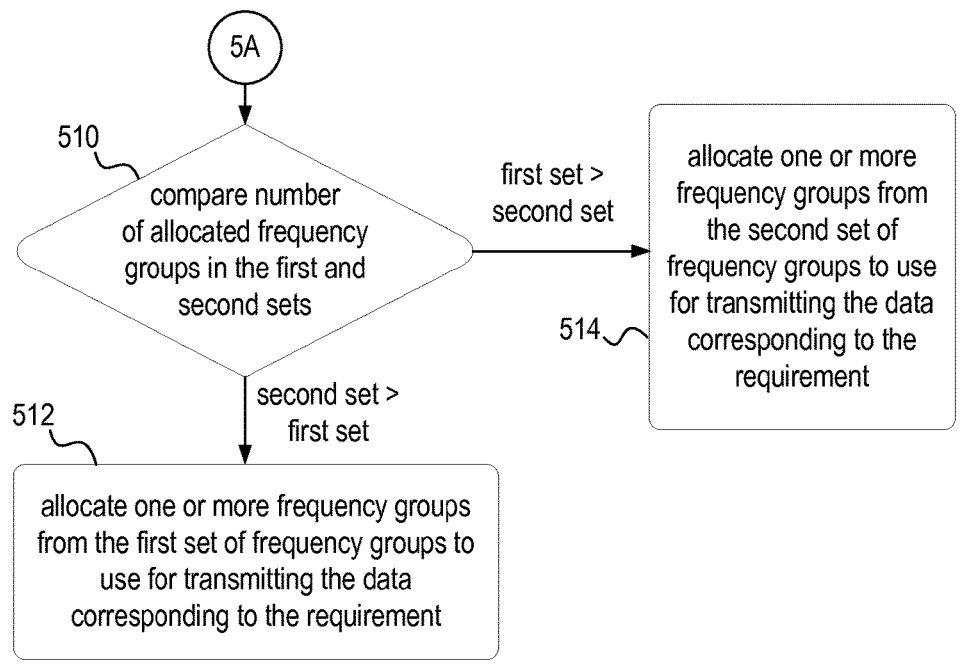
FIG. 5C is a method flow chart depicting aspects of some embodiments of the disclosed systems and methods.

On the other hand, if the base station determines that the particular UE is communicating directly with the base station, then method 500 advances to block 508 in FIG. 5B in some embodiments, but in other embodiments, method 500 advances to method block 510 in FIG. 5C.

FIG. 5B is a flow chart of some embodiments of method 500. If at block 504 (FIG. 5A), the base station determines that the particular UE is communicating directly with the base station, then method 500 advances to block 508 of FIG. 5B. At block 508, the base station allocates one or more frequency groups from the second set of frequency groups to use for transmitting the data to satisfy the requirement to and/or from the base station and the particular UE.

FIG. 5C is a flow chart of some alternative embodiments of method 500. If at block 504 (FIG. 5A), the base station determines that the particular UE is communicating directly with the base station, then method 500 advances to block 510 of FIG. 5C. At block 510, the base station determines how many frequency groups in each of the first and second sets of frequency groups are currently allocated for data transmissions for other UEs.

If at block 510, the base station determines that the number of currently allocated frequency groups of the second set is greater than the number of currently allocated frequency groups of the first set, then method 500 advances to block 512, where the base station allocates one or more frequency groups from the first set to use for transmitting data to satisfy the requirement to and/or from the base station and the particular UE.

But if at block 510, the base station determines that the number of currently allocated frequency groups of the first set is greater than the number of currently allocated frequency groups of the second set, then method 500 advances to block 514, where the base station allocates one or more frequency groups from the second set to use for transmitting data to satisfy the requirement to and/or from the base station and the particular UE.

While various aspects have been disclosed herein, other aspects will be apparent to those of skill in the art. The various aspects disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting. For example, while the disclosed embodiments focus on LTE-based implementations, the disclosed systems and methods are equally applicable to any other protocol or network implementation that is configurable to allocate frequencies to traffic demands as described herein.

What is claimed is:

1. A method comprising:
   determining that a requirement exists to transmit data between a particular UE and a base station, wherein the base station and the particular UE are configured to operate in a frequency range, wherein the frequency range comprises a first set of frequency groups and a second set of frequency groups, and wherein frequency groups of the first set are less susceptible to group delay variation based impairments than frequency groups of the second set;
   in response to determining the existence of the requirement, determining whether the particular UE is receiving wireless service directly from the base station or via a relay associated with the base station;
   in response to determining that the particular UE is receiving wireless service via the relay, allocating one or more frequency groups from the first set of frequency groups to use for transmitting the data to satisfy the requirement;
   in response to determining that the UE is receiving wireless service directly from the base station, determining a number of frequency groups in each of the first and second sets of frequency groups that are currently allocated for data transmissions associated with other UEs;

in response to determining that the number of currently allocated frequency groups of the first set exceeds the number of currently allocated frequency groups of the second set, allocating one or more frequency groups from the second set to use for transmitting the data to satisfy the requirement; and in response to determining that the number of currently allocated frequency groups of the second set exceeds the number of currently allocated frequency groups of the first set, allocating one or more frequency groups from the first set to use for transmitting the data to satisfy the requirement.

2. The method of claim 1, further comprising:
in response to determining that the UE is receiving wireless service directly from the base station, allocating one or more frequency groups from the second set of frequency groups to use for transmitting data to satisfy the requirement.

3. The method of claim 1, wherein the requirement is to transmit data from the UE to the base station.

4. The method of claim 1, wherein the requirement is to transmit data from the base station to the UE.

5. The method of claim 1, wherein the data is any of (i) a voice call, (ii) a video call, (iii) Internet data, or (iv) a text message.

6. The method of claim 1, wherein determining whether the UE is receiving wireless service directly from the base station or via a relay associated with the base station is based on GPS coordinates of the UE.

7. The method of claim 1, wherein the base station is an LTE eNodeB, wherein the frequency range lies within or is coextensive with an LTE band, and wherein each frequency group is an LTE resource block.

8. A system comprising:
a relay comprising one or more filters and amplifiers, wherein the relay is configured to operate in a frequency range comprising a first set of frequency groups and a second set of frequency groups, wherein frequency groups of the first set are less susceptible to group delay variation based impairments than frequency groups of the second set; and a base station comprising one or more filters, one or more amplifiers, and one or more transceivers configured to operate in the frequency range, wherein the base station is associated with the relay, and wherein the base station is configured to:

(i) determine that a requirement exists to transmit data between the base station and a particular UE;

(ii) in response to determining the existence of the requirement, determine whether the particular UE is communicating directly with a base station transceiver of the one or more transceivers or communicating indirectly with the base station transceiver via the relay based on GPS coordinates associated with the particular UE: and (iii) in response to determining that the particular UE is communicating indirectly with the base station transceiver via the relay, allocate one or more frequency groups from the first set of frequency groups to use for transmitting the data to satisfy the requirement.

9. The system of claim 8, wherein the base station is further configured to (iv) in response to determining that the particular UE is communicating directly with the base station transceiver, allocate one or more frequency groups from the second set of frequency groups to use for transmitting data to satisfy the requirement.

10. The system of claim 8, wherein the base station is further configured to (iv) in response to determining that the particular UE is communicating directly with the base station transceiver, determine a number of frequency groups in each of the first and second sets of frequency groups that are currently allocated for data transmissions for other UEs, (v) in response to determining that the number of currently allocated frequency groups of the first set is greater than the number of currently allocated frequency groups of the second set, allocate one or more frequency groups from the second set to use for transmitting data to satisfy the requirement, and (vi) in response to determining that the number of currently allocated frequency groups of the second set is greater than the number of currently allocated frequency groups of the first set, allocate one or more frequency groups from the first set to use for transmitting data to satisfy the requirement.

11. The system of claim 8, wherein the requirement includes one or both (i) a requirement to transmit data from the base station to the particular UE and/or (ii) a requirement to transmit data from the particular UE to the base station.

12. The system of claim 8, wherein the data is any of (i) a voice call, (ii) a video call, (iii) Internet data, or (iv) a text message.

13. The system of claim 8, wherein the base station is an LTE eNodeB, wherein the frequency range lies within or is coextensive with an LTE band, and wherein each frequency group is an LTE resource block.

14. A base station comprising:
one or more transceivers and filters configured to operate in a frequency range comprising a first set of frequency groups and a second set of frequency groups, wherein frequency groups of the first set are less susceptible to group delay variation based impairments than frequency groups of the second set; one or more processors; and tangible, non-transitory computer readable memory having instructions stored thereon that, upon execution by the one or more processors, cause the base station to perform functions comprising:

determining that a requirement exists to transmit data between the base station and a particular UE, wherein the data includes voice, video, text, or Internet data;

in response to determining the existence of the requirement, determining whether the particular UE is receiving wireless service directly from the base station or via a relay associated with the base station;

in response to determining that the particular UE is receiving wireless service via the relay, allocating one or more frequency groups from the first set of frequency groups to use for transmitting the data between the base station and the particular UE to satisfy the requirement;

in response to determining that the particular UE is receiving wireless service directly from the base station, determining a number of frequency groups in each of the first and second sets of frequency groups that are currently allocated for transmitting other data:

in response to determining that the number of currently allocated frequency groups of the first set exceeds the number of currently allocated frequency groups of the second set, allocating one or more frequency groups from the second set to use for transmitting the data between the base station and the particular UE to satisfy the requirement: and in response to determining that the number of currently allocated frequency groups of the second set exceeds the number of currently allocated frequency groups of the first set, allocating one or more frequency groups from the first set to use for transmitting the data between the base station and the particular UE to satisfy the requirement.

15. The base station of claim 14, wherein the stored instructions, when executed by the one or more processors, cause the base station to perform additional functions comprising:

in response to determining that the particular UE is receiving wireless service directly from the base station, allocating one or more frequency groups from the second set of frequency groups to use for transmitting data between the base station and the particular UE to satisfy the requirement.

16. The base station of claim 14, wherein determining whether the particular UE is receiving wireless service directly from the base station or via a relay associated with the base station is based on GPS coordinates of the particular UE.

17. The base station of claim 14, wherein the base station is an LTE eNodeB, wherein the frequency range lies within or is coextensive with an LTE band, and wherein each frequency group is an LTE resource block.

* * * * *